(12) United States Patent
Liang et al.

(10) Patent No.: US 8,908,871 B2
(45) Date of Patent: Dec. 9, 2014

(54) MOBILE INTERNET PROTOCOL SYSTEM AND METHOD FOR UPDATING HOME AGENT ROOT KEY

(75) Inventors: Wenliang Liang, Shenzhen (CN); Jianjun Wu, Shenzhen (CN); Xianhui He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 961 days.

(21) Appl. No.: 12/503,621

(22) Filed: Jul. 15, 2009

(65) Prior Publication Data
US 2009/0279704 A1    Nov. 12, 2009

Related U.S. Application Data

(63) Continuation of application No. PCT/CN2008/070044, filed on Jan. 8, 2008.

(30) Foreign Application Priority Data

Jan. 16, 2007   (CN) .......................... 2007 1 0007446

(51) Int. Cl.
| | | |
|---|---|---|
| H04L 9/08 | (2006.01) | |
| H04L 9/32 | (2006.01) | |
| H04L 29/06 | (2006.01) | |
| H04W 12/04 | (2009.01) | |
| H04W 80/04 | (2009.01) | |
| H04W 60/00 | (2009.01) | |

(52) U.S. Cl.
CPC ............ H04L 9/0891 (2013.01); H04L 9/0844 (2013.01); H04W 80/04 (2013.01); H04L 2209/80 (2013.01); H04W 60/00 (2013.01); H04L 63/061 (2013.01); H04W 12/04 (2013.01); H04L 63/162 (2013.01); H04L 9/083 (2013.01)

USPC .......................................... 380/284; 713/168

(58) Field of Classification Search
CPC ........... H04L 9/08; H04L 9/0822; H04L 9/30; H04L 63/0428; G06F 21/10
USPC ................. 380/284, 247–250, 270–274, 277; 455/410, 411; 713/169, 168, 167, 166
See application file for complete search history.

(56) References Cited

U.S. PATENT DOCUMENTS

6,496,932 B1 * 12/2002 Trieger ......................... 713/168
8,078,872 B2 * 12/2011 Zhao ............................. 713/168

(Continued)

FOREIGN PATENT DOCUMENTS

| CN | 1714560 A | 12/2005 |
|---|---|---|
| JP | 2004-320494 A | 11/2004 |

OTHER PUBLICATIONS

Written Opinion of the International Searching Authority, mailed Apr. 17, 2008, in corresponding International Application PCT/CN2008/070044 (3 PP.)

(Continued)

Primary Examiner — Abu Sholeman
(74) Attorney, Agent, or Firm — Staas & Halsey LLP

(57) ABSTRACT

The AAA server generates and delivers a new HA-RK before expiry of the old HA-RK, thus eliminating the time gap between expiry of the old HA-RK and obtaining of the new HA-RK and making the MIP registration seamless. In the system, if the remaining lifetime of the old HA-RK is less than or equal to the lifecycle of the MSK in the EAP process, a new HA-RK is delivered; otherwise, no new HA-RK needs to be delivered. If both a new HA-RK and an old HA-RK are valid on the network entity at a time, then only the old HA-RK applies and the new HA-RK is not active until expiry of the old HA-RK. Alternatively, both the new HA-RK and the old HA-RK are active concurrently, and are differentiated by an SPI.

11 Claims, 7 Drawing Sheets

(56) References Cited

U.S. PATENT DOCUMENTS

| | | | |
|---|---|---|---|
| 8,397,071 B2* | 3/2013 | Cho et al. | 713/175 |
| 2003/0031319 A1* | 2/2003 | Abe et al. | 380/232 |
| 2004/0073786 A1* | 4/2004 | O'Neill et al. | 713/155 |
| 2006/0236116 A1* | 10/2006 | Patel | 713/183 |
| 2007/0005972 A1* | 1/2007 | Mizikovsky et al. | 713/171 |
| 2007/0118879 A1* | 5/2007 | Yeun | 726/3 |
| 2007/0186108 A1* | 8/2007 | Passarella et al. | 713/171 |
| 2007/0206537 A1* | 9/2007 | Cam-Winget et al. | 370/331 |
| 2008/0043614 A1* | 2/2008 | Soliman | 370/208 |
| 2008/0178269 A1* | 7/2008 | Kim et al. | 726/4 |
| 2008/0285749 A1* | 11/2008 | Suh et al. | 380/45 |
| 2009/0132817 A1* | 5/2009 | Zhao | 713/168 |
| 2009/0240944 A1* | 9/2009 | Cho et al. | 713/175 |
| 2010/0217837 A1* | 8/2010 | Ansari et al. | 709/218 |
| 2011/0264915 A1* | 10/2011 | Cam-Winget et al. | 713/171 |
| 2013/0067552 A1* | 3/2013 | Hawkes et al. | 726/7 |
| 2013/0117820 A1* | 5/2013 | Cherian et al. | 726/4 |

OTHER PUBLICATIONS

Office Action, mailed Feb. 5, 2010, in corresponding Chinese Application 200710007446.7 (9 pp. including translation).

* cited by examiner

MOBILE INTERNET PROTOCOL SYSTEM AND METHOD FOR UPDATING HOME AGENT ROOT KEY

CROSS-REFERENCE TO RELATED APPLICATION APPLICATIONS

This application is a continuation of International Application No. PCT/CN2008/070044, filed on Jan. 8, 2008, which claims the benefit of Chinese Patent Application No. 200710007446.7, filed on Jan. 16, 2007, both of which are hereby incorporated by reference in their entireties.

FIELD OF THE TECHNOLOGY

The present invention relates to mobile communication, and in particular, to a technology for updating a Home Agent Root Key (HA-RK) in a Mobile Internet Protocol (MIP) system.

BACKGROUND OF THE INVENTION

The IEEE802.16 is a standard formulated by the Institute of Electrical and Electronics Engineers (IEEE) in December 2001 for providing the last-mile wireless broadband access in a Metropolitan Area Network (MAN).

Meanwhile, multitudinous equipment and construction providers make up a Worldwide Interoperability for Microwave Access (WiMAX) organization for speeding up the deployment of the IEEE802.16-based wireless broadband networks by ensuring compatibility and interoperability of the wireless broadband access equipment. Therefore, a system for implementing wireless broadband access based on the 802.16 series is generally called a WiMAX system.

With the boom of Internet services and the popularization of wireless networks, mobile subscribers impose higher and higher security requirements on the wireless system. Nowadays, operators not only need to handle device authentication, user authentication, and service authorization, but also need to pay massive attention to the setup of a security channel between a mobile subscriber and an Access Point (AP) or Base Station (BS), the switching of confidential information, the confidential channel between a BS and an authenticator, the confidential channel between an authenticator and an Authentication Authorization Accounting (AAA) server, and the switching of confidential information, which are not necessarily considered in traditional dedicated networks. Therefore, a WiMAX network is in security network architecture without considering other internal devices in the access network, as shown in FIG. 1 or FIG. 2.

In the centralized architecture shown in FIG. 1, the authenticator and the BS are located in different physical entities, the functions of an authenticator and a key distributor are implemented in the authenticator, and the functions of authentication relay and key receiver are implemented in the BS.

In the distributed network architecture shown in FIG. 2, the authenticator and the BS are located in the same physical entity. This entity implements the functions of an authenticator, authentication relay, key distributor and key receiver.

Described below are the functions of the Network Elements (NEs), including logical NEs, in FIG. 1 and FIG. 2.

BS: A BS provides a security channel between a BS and a Mobile Station (MS) for compression and encryption of air interface data, and provides switching of confidential information between the BS and MS.

Authenticator: An authenticator provides proxy functions for the AAA function entity of the MS, and is implemented in the physical entity of the key distributor.

Authentication relay: An authentication relay implements relay of authentication requests and response messages in the authentication process.

Key distributor: A key distributor is implemented in the physical entity of the authenticator. According to the peer root key information for communication with the MS provided by the AAA server, the key distributor generates an air interface Authentication Key (AK) shared between the BS and the MS, and distributes the AK onto the key receiver.

Key receiver: A key receiver works in a BS to receive the AK generated and sent by the key distributor, and derive other keys between the BS and MS.

Besides, the complete architecture of a security network needs to further include an AAA server and an MS in the back-end network. The AAA server performs authentication, authorization and accounting for the MS, and exchanges the information required for generating keys with the MS according to key generation mechanism agreed with the MS. Such information is exchanged before the security channel is set up. Therefore, the key algorithms applied between the AAA server and the MS need to ensure that disclosure of information does not affect the security mechanism. The functions of an AAA server are to:

perform authentication, authorization, and accounting for an MS;

generate and distribute root key information to an authenticator; and notify the authenticator and other NEs in time of the consequence caused by information change, when the user information changes.

The MS initiates authentication and authorization in the security architecture, exchanges the information required for generating root keys with the AAA server, generates root keys, and generates the AK required for confidentiality on an air interface and other derived key information according to the root key.

In the network architecture, the function entities related to a MIP include: Mobile Node (MN), namely, MS; Foreign Agent (FA); and Home Agent (HA). The MN originates a MIP registration request to the HA through an FA. After receiving the MIP registration request, the HA makes the Care-of-Address (CoA) of the MN correspond to the Home Address (HoA). All data packets received by the HA subsequently are forwarded to the CoA address, namely, FA address in the Mobile Internet Protocol version 4, MIPv4, if the destination address of the data packet is the HoA. In order to ensure security, a MIP message generally carries an Authentication Extension (AE), for example, the authentication extension "MN-HA-AE" between the MN and the MA. When the HA receives a MIP registration request that carries an MN-HA-AE, the HA calculates out a local authentication value according to the known key information, and then compares it with the MN-HA-AE carried in the data packet. If the local authentication value matches the MN-HA-AE, the authentication succeeds, and the MIP registration request is handled; otherwise, the MIP registration request is rejected.

In the WiMAX, the MIP comes in two forms as shown in FIG. 3a and FIG. 3b: Client MIP (CMIP), and Proxy MIP (PMIP). The terminal that supports the MIP protocol works in the CMIP mode. Conversely, if the terminal does not support the MIP protocol, the network creates a PMIP-client entity for implementing the functions of the MIP.

Currently, the Network Authentication Server (NAS) maintains the lifecycle of the HA-RK. Once the lifecycle of the HA-RK expires, the NAS requests a new HA-RK and relevant information from the AAA server that allocates the HA-RK.

However, a time gap exists between expiry of the old HA-RK and obtaining of the new HA-RK. During the gap, no MIP registration can be handled, which brings a certain delay in some scenarios and affects the MIP registration process.

Besides, the HA-RK needs to be delivered in every Extensible Authentication Protocol (EAP) process, thus leading to low efficiency of the EAP process.

SUMMARY OF THE INVENTION

Various embodiments of the present invention provide a MIP system and a method for updating the HA-RK in order to perform MIP registration seamlessly.

One embodiment of the present invention provides a method for updating an HA-RK in a MIP system. According to the method, before expiry of the old HA-RK, the AAA server generates a new HA-RK, and sends the new HA-RK to the network entity that uses the HA-RK.

A MIP system provided in an embodiment of the present invention includes:

an AAA server, at least one network entity that uses an HA-RK, and a judging unit. The judging unit is adapted to: judge whether the remaining lifetime of the old HA-RK fulfills a preset condition before expiry of the old HA-RK; and instruct the AAA server to generate a new HA-RK and send the new HA-RK to the at least one network entity that uses the HA-RK, if the remaining lifetime fulfills the preset condition.

Compared with the prior art, the embodiments of the present invention provide the following benefits:

The AAA server generates and delivers a new HA-RK before expiry of the old HA-RK, thus eliminating the time gap between expiry of the old HA-RK and obtaining of the new HA-RK and making the MIP registration seamless.

On condition that the lifecycle of the HA-RK is greater than the lifecycle of the Master Session Key (MSK), if the remaining lifetime of the old HA-RK is less than or equal to the lifecycle of the MSK in the EAP process, a new HA-RK is delivered; otherwise, no new HA-RK needs to be delivered. Through the relevant mechanism in the EAP process, it is ensured that a new HA-RK is delivered in time before expiry of the old HA-RK. Without the need of delivering the HA-RK in every EAP process, the EAP process is more efficient.

If both a new HA-RK and an old HA-RK are valid on the network entity at a time, then only the old HA-RK applies and the new HA-RK is not active until expiry of the old HA-RK. Alternatively, both the new HA-RK and the old HA-RK are active concurrently, and are differentiated by a Security Parameter Index (SPI). In this way, the conflict between two coexistent HA-RKs is overcome.

In an EAP process, if the HA has a new HA-RK and an old HA-RK but the NAS has no HA-RK, both the new HA-RK and the old HA-RK are delivered to the NAS so that the NAS can use the two HA-RKs to interact with the HA.

If the HA-RK and the MSK are generated by two different AAA servers, the two AAA servers need to exchange the information about the lifecycle of the HA-RK and/or MSK. In this way, the technical solution under the present invention is also applicable in the case that the HA-RK and the MSK are generated by different AAA servers.

DETAILED DESCRIPTION OF THE EMBODIMENTS

In order to make the technical solution, and merits of the present invention clearer, the present invention is hereinafter described in detail by reference to accompanying drawings and preferred embodiments.

Figure 1:
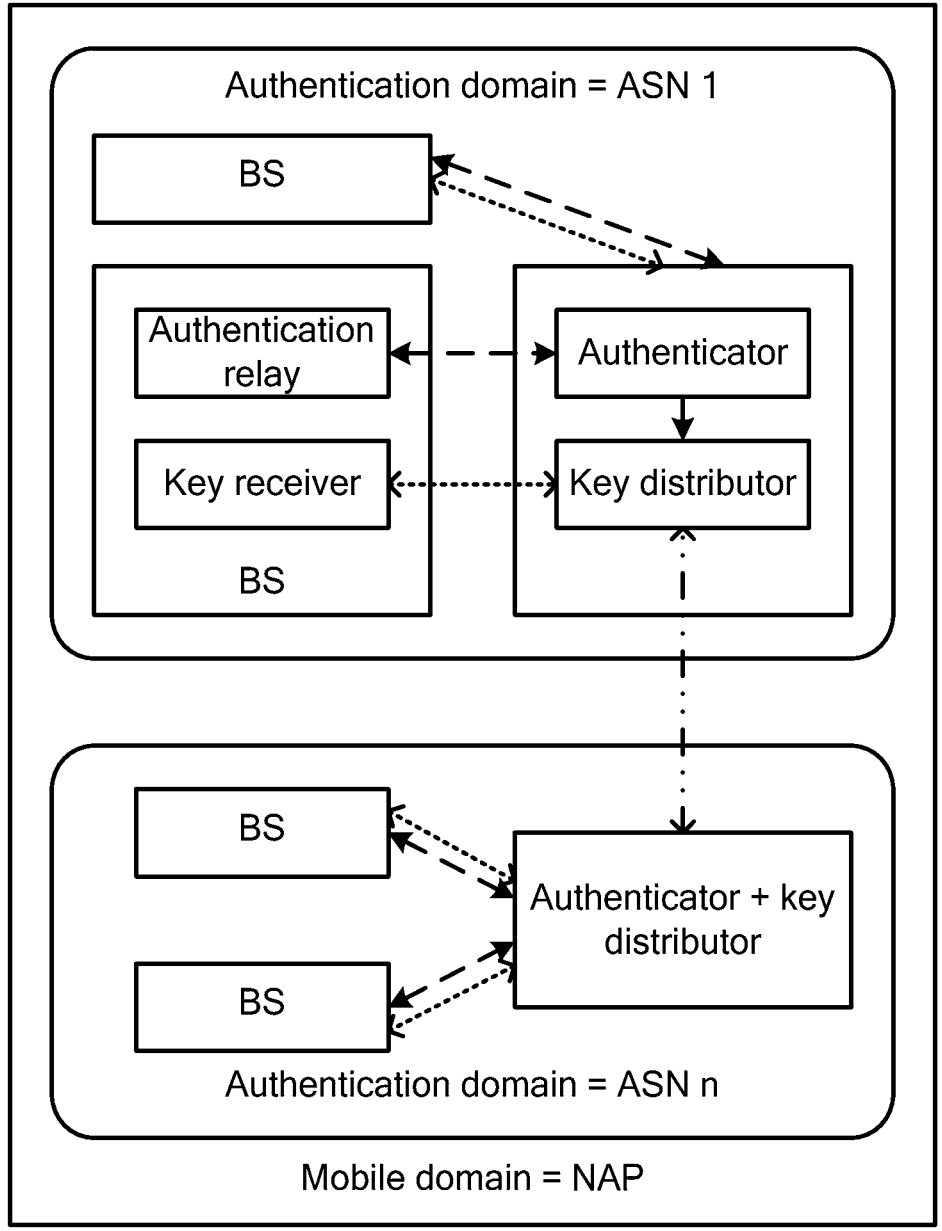
FIG. 1 shows centralized network architecture of a WiMAX network in the prior art.
Figure 2:
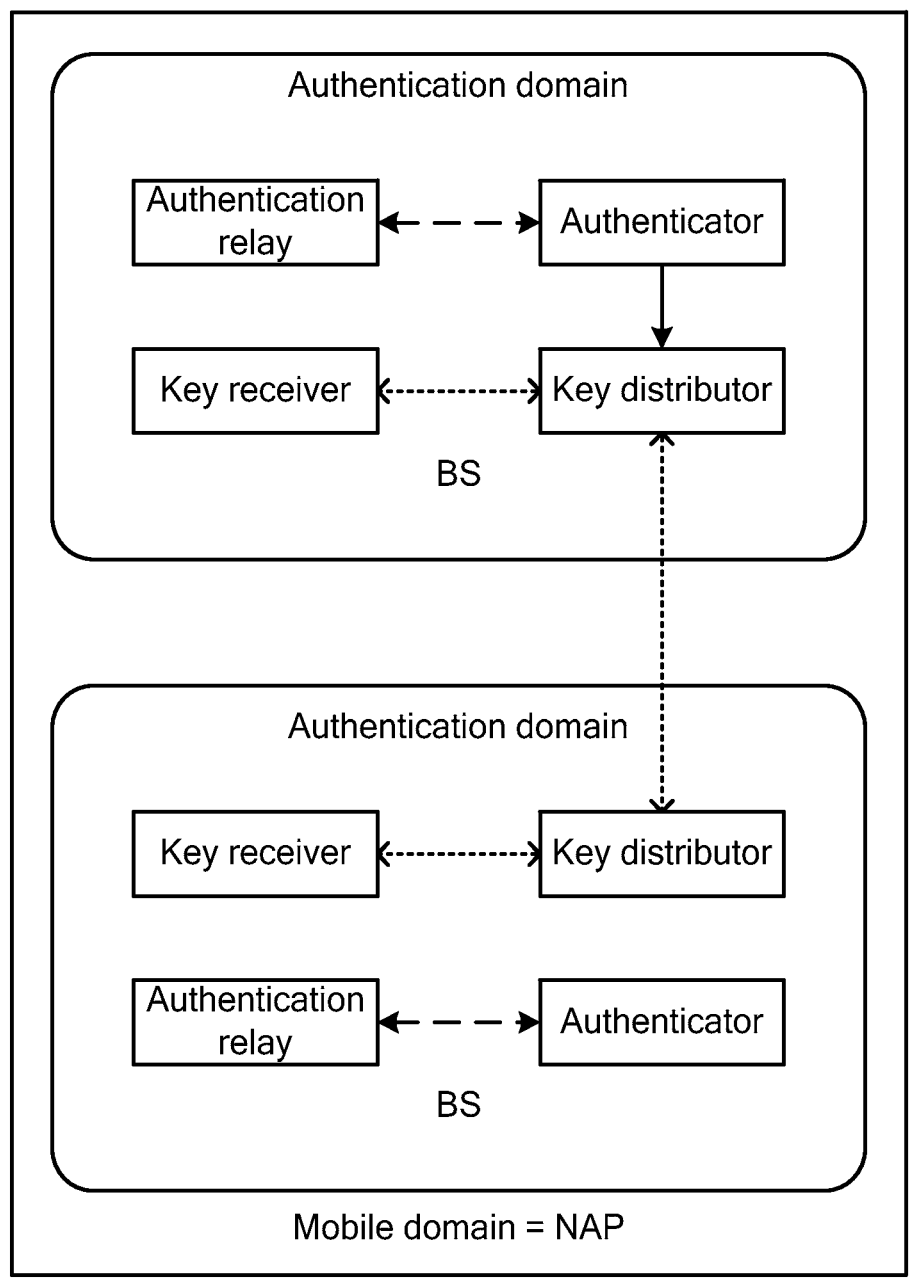
FIG. 2 shows distributed network architecture of a WiMAX network in the prior art.
Figure 3A:
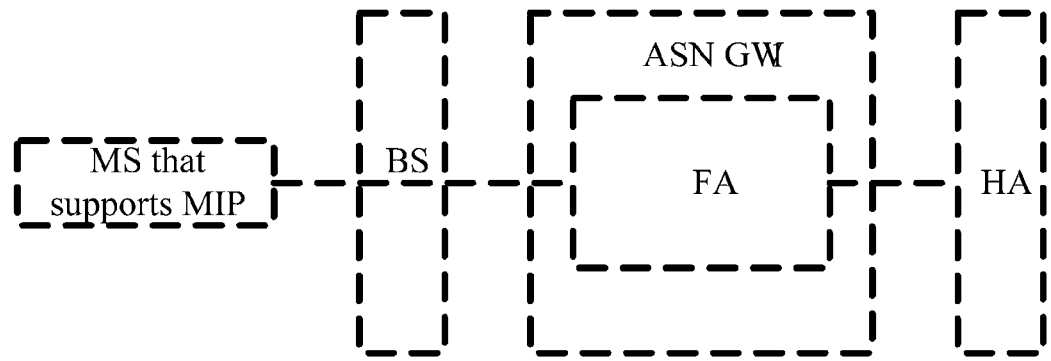
FIG. 3a and FIG. 3b show two types of MIP in a WiMAX network in the prior art.
Figure 3B:
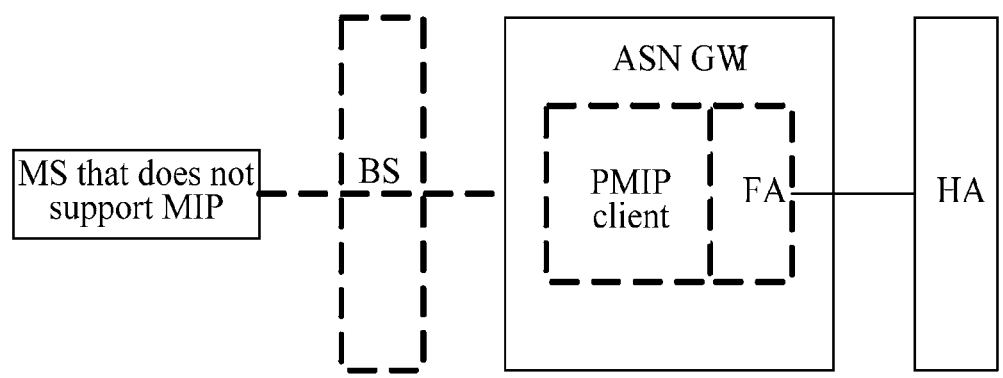
Figure 4:
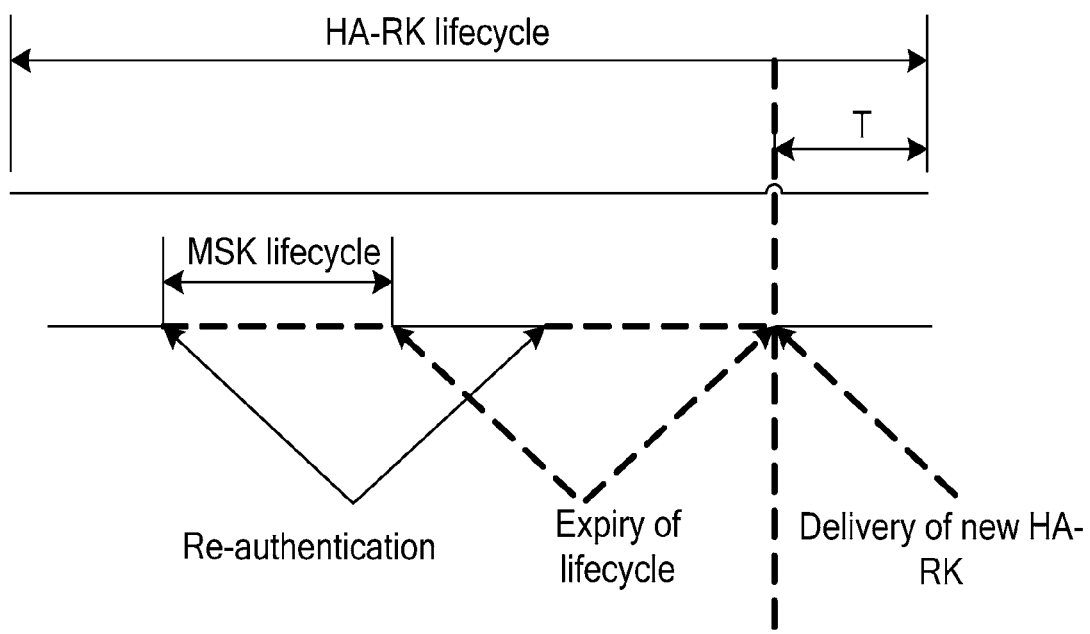
FIG. 4 shows a process of delivering an HA-RK beforehand in an embodiment of the present invention.

In the embodiments of the present invention, through an EAP process, the AAA server generates and delivers a new HA-RK to the NAS before expiry of the old HA-RK, thus eliminating the time gap between expiry of the old HA-RK and obtaining of the new HA-RK and making the MIP registration seamless. As shown in FIG. 4, when an EAP process of the MS is triggered for whatever reasons, for example, due to initial authentication or re-authentication, if the AAA server or proxy finds for the first time that the remaining lifetime as shown by "T" in FIG. 4 of the HA-RK is less than the lifecycle of the MSK generated for the MS, the AAA server generates a new HA-RK together with the SPI and lifecycle, which are carried in an Access-Accept message. The AAA server may record the address of the NAS. No HA-RK related information needs to be delivered for the EAP in the subsequent EAP process so long as the AAA server does not generate any new HA-RK again, thus improving the efficiency of the EAP process.

All embodiments of the present invention are based on this prerequisite: The lifecycle of the MSK is less than the lifecycle of the HA-RK. The lifecycle here refers to a complete lifecycle rather than the remaining lifetime. If the MSK and HA-RK are generated by the same AAA server, the AAA server ensures the prerequisite. If the MSK and HA-RK are generated by two different AAA servers, the two AAA servers ensure the prerequisite through negotiation.

Figure 5:
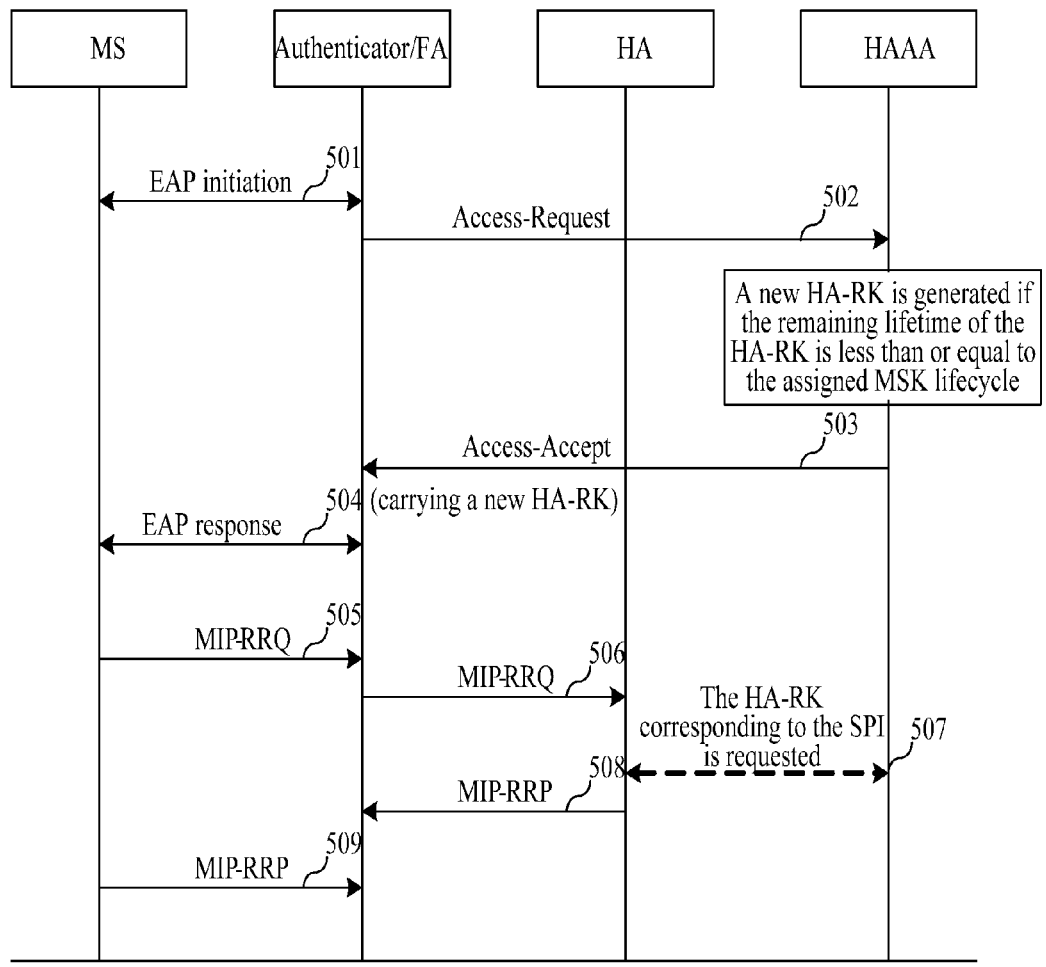
FIG. 5 is a flowchart of a method for updating an HA-RK in a MIP system according to the first embodiment of the present invention.

The first embodiment of the present invention is detailed below. The first embodiment relates to a method for updating an HA-RK in a MIP system. In this embodiment, the MIP system is a WiMAX system, and the HA-RK and MSK are generated by the same AAA server, as shown in FIG. 5.

In step 501, the MS initiates an EAP process. For example, the MS triggers an EAP process at the time of initial authentication or when re-authentication is required. The EAP process may also be initiated by a relevant entity in the network. The embodiments of the present invention emphasize the use of the EAP process, and do not care which entity initiates the EAP process.

In the subsequent step 502, the authenticator, namely, NAS, or FA sends an Access-Request message to the Home AAA (HAAA) server. After receiving the message, the HAAA server allocates an MSK lifecycle to the MS. The MSK lifecycle allocated by the HAAA server to the MS is not greater than the HA-RK lifecycle allocated to it. The HAAA server generates a new HA-RK if the previously allocated HA-RK lifecycle is about to expire, namely, if the remaining lifetime of the HA-RK is about to be less than or equal to the MSK lifecycle generated for the MS. The MSK lifecycle allocated to the MS is not greater than the lifecycle of the new HA-RK. In this embodiment, the HA-RK and MSK are generated by the same AAA server. The AAA server may know the lifecycle and remaining lifetime of the MSK and HA-RK. Therefore, it is easy to allocate the foregoing MSK lifecycle and judge whether a new HA-RK needs to be generated.

It is worthy of attention that the lifecycle of the HA-RK and MSK may be fixed, namely, constant, or allocated dynamically, namely, variable. The basic requirements of this embodiment are fulfilled only if the lifecycle of the HA-RK is greater than the lifecycle of the MSK.

If it is the first time that the HA of the MS is allocated to an MS, namely, if no corresponding HA-RK information exists, the HAAA server generates an HA-RK and delivers it. If the HA has the corresponding HA-RK information (and only one corresponding HA-RK) but the HAAA server has generated a new HA-RK due to imminent expiry of the previously allocated HA-RK, the HAAA server needs to deliver the new HA-RK.

In the subsequent step 503, the HAAA server sends an Access-Accept message to the authenticator, namely, NAS, or FA. If the HAAA server has generated a new HA-RK due to imminent expiry of the lifecycle of the previously allocated HA-RK, the HAAA server needs to attach the information about the new HA-RK into the Access-Accept message. By this means, the relevant mechanism of the EAP process ensures that the new HA-RK is delivered in time before expiry of the old HA-RK. The Access-Accept message may further include the SPI corresponding to the HA-RK and/or the lifecycle of the HA-RK.

Specifically, if the HA has the corresponding HA-RK information (and only one corresponding HA-RK) and the HAAA server does not need to generate any new HA-RK, the HAAA server needs to judge whether the current HA-RK has been delivered to the NAS according to the NAS identifier in the Access-Request message. If the current HA-RK has not been delivered, the information about the current HA-RK is delivered to the NAS through an Access-Accept message.

If the HA already corresponds to two HA-RKs, it indicates that the HAAA server has generated a new HA-RK before expiry of the old HA-RK. Therefore, the HAAA server needs to judge whether any HA-RK has been delivered to the NAS according to the NAS identifier in the Access-Request message. If no HA-RK has been delivered, the HAAA server needs to deliver two HA-RKs. If an existing HA-KR has been delivered but no new HA-RK has been delivered to the NAS, the HAAA server delivers a new HA-RK through an Access-Accept message. The AAA server generates and delivers a new HA-RK before expiry of the old HA-RK, thus eliminating the time gap between expiry of the old HA-RK and obtaining of the new HA-RK and making the MIP registration seamless.

It is worthy of attention that: If the HAAA server determines that the current HA-RK has been delivered to the NAS according to the NAS identifier in the Access-Request message and determines that it is unnecessary to generate a new HA-RK, the Access-Accept message does not need to carry the HA-RK information, thus improving the efficiency of the EAP process.

This embodiment supposes that the old HA-RK is about to expire and the HAAA server attaches a new HA-RK into the Access-Accept message. Therefore, the NAS stores two HA-RKs.

In the subsequent step 504, the authenticator, namely, NAS or FA sends a response message of the EAP to the MS. The NAS updates the local HA-RK information after receiving the Access-Accept message. The NAS needs to maintain the lifecycle of the HA-RK, and cannot delete an old HA-RK before expiry of the old HA-RK. The FA stores a new valid HA-RK and an old valid HA-RK. Therefore, the old HA-RK remains active and the new HA-RK does not work until expiry of the lifecycle of the old HA-RK. Alternatively, both the old HA-RK and the new HA-RK are active concurrently and differentiated by an SPI, thus eliminating conflict that may occur when two HA-RKs coexist.

In the subsequent step 505, the MS sends a MIP Registration Request (MIP-RRQ) message to the FA. If the FA and NAS are on different entities, the FA may obtain the HA-RK and relevant information through interaction with the NAS. Specifically, the NAS obtains such information and sends it to the FA proactively, or the FA seeks such information from the NAS when necessary.

In the subsequent step 506, the FA calculates the FA-HA authentication extension of the MIP-RRQ, and sends the MIP-RRQ that carries the FA-HA authentication extension to the HA. With two valid HA-RKs stored on the FA, the FA may select an HA-RK randomly to calculate the HA-RK authentication extension of the MIP-RRQ after receiving the MIP-RRQ from the MS if the lifecycle of the old FA-HA has not expired. The extension carries an SPI value.

After receiving the MIP-RRQ, the HA searches for the HA-RK according to the SPI, and authenticates and handles the found HA-RK directly. If no HA-RK is found, the process proceeds to step 507, and requests the HA-RK of the SPI from the HAAA server, namely, sends an Access-Request message. Through a response message, the HA obtains the requested HA-RK. Alternatively, the HA maintains the lifecycle of the HA-RK, and requests a new HA-RK proactively upon expiry of the old HA-RK, without waiting for being triggered by the MIP.

In step 508, the HA sends a MIP Registration Response (MIP-RRP) message to the FA after authenticating and handling the MIP-RRQ message. The HA calculates the FA-HA authentication extension of the MIP-RRP according to the key corresponding to the SPI used for authenticating the MIP-RRQ, and sends the MIP-RRP message that carries the FA-HA authentication extension to the FA. The HA-RK used by the MIP-RRP is not necessarily consistent with the HA-RK used for authenticating the MIP-RRQ, and is appropriate only if the SPI in the corresponding message specifies the HA-RK in use.

In the subsequent step 509, the authenticator, namely, NAS, or FA sends a MIP-RRP message to the MS, indicating registration success.

The second embodiment of the present invention relates a method for updating an HA-RK in a MIP system. The second embodiment is almost the same as the first embodiment except that: In the first embodiment, the HA-RK and MSK are generated by the same AAA server; in this embodiment, the HA-RK and MSK are generated by different AAA servers. In the EAP process, therefore, the AAA server that generates the MSK obtains the lifecycle of the HA-RK from the AAA server that generates the HA-RK, and assigns the lifecycle of the MSK according to the obtained HA-RK lifecycle. The lifecycle of the MSK needs to be less than the lifecycle of the HA-RK.

If the obtained HA-RK lifecycle is about to expire, namely, if the remaining lifetime of the HA-RK is about to be less than or equal to the MSK lifecycle generated for the MS, the AAA server that generates the MSK needs to instruct the AAA server that generates the HA-RK to generate and deliver a new HA-RK. By this means, it is ensured that the remaining lifetime of the HA-RK is greater than the lifecycle of the MSK, and the MIP registration goes on seamlessly.

Evidently, if the HA-RK and the MSK are generated by two different AAA servers, the two AAA servers need to exchange the information about the lifecycle of the HA-RK. In this way, the technical solution under the present invention is also applicable in the case that the HA-RK and the MSK are generated by different AAA servers.

The third embodiment of the present invention relates a method for updating an HA-RK in a MIP system. The second embodiment is almost the same as the first embodiment except that: In the first embodiment, the HA-RK and MSK are generated by the same AAA server; in this embodiment, the HA-RK and MSK are generated by different AAA servers. Moreover, in this embodiment, the HA-RK is generated by a Visited AAA server (V-AAA server), and the MSK is generated by an HAAA server. That is, the V-AAA server knows the lifecycle and remaining lifetime of the HA-RK; and the HAAA server knows the lifecycle of the MSK to be delivered.

Figure 6:
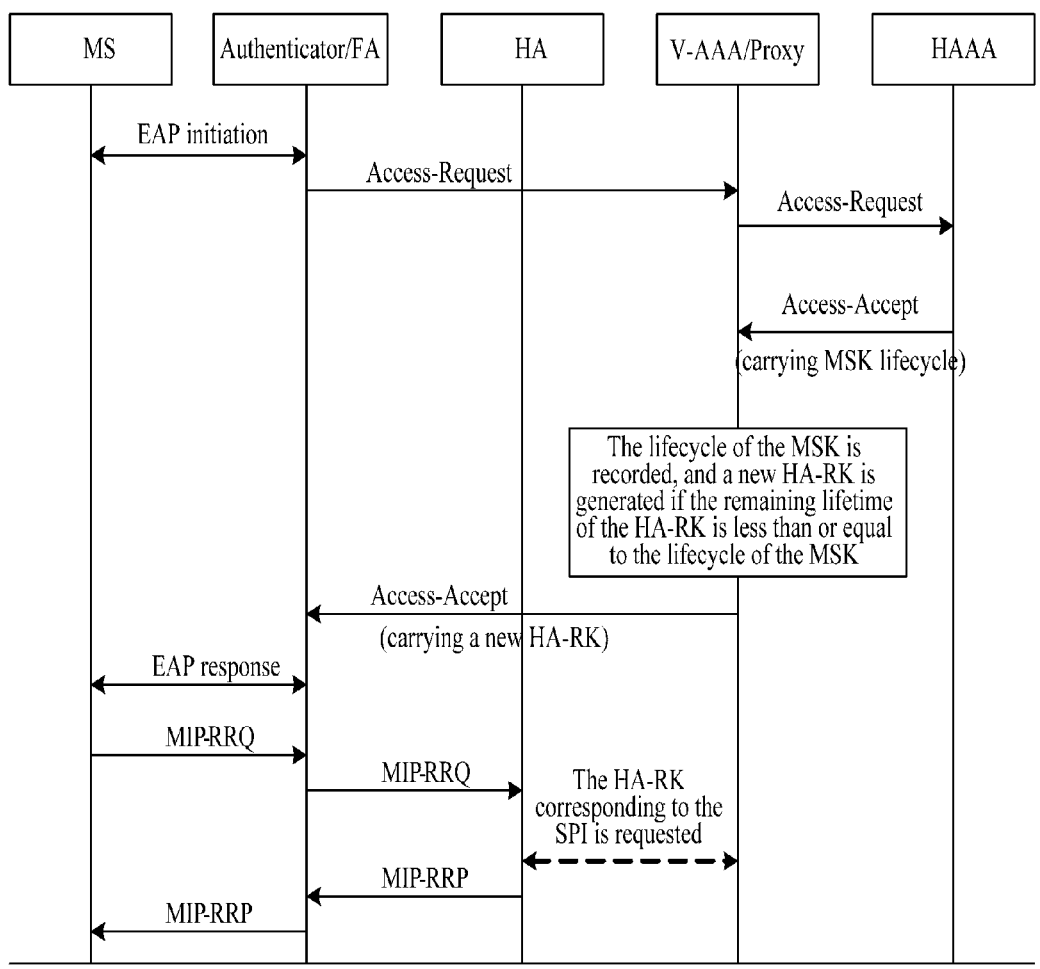
FIG. 6 is a flowchart of a method for updating an HA-RK in a MIP system according to the third embodiment of the present invention.

As shown in FIG. 6, in the EAP process, the V-AAA server/proxy forwards an Access-Request message to the HAAA server after receiving the Access-Request message from the authenticator, namely, NAS, or FA, and forwards an Access-Accept message from the HAAA server to the authenticator, namely, NAS, or FA. The assignment of the MSK is still performed by the HAAA server. After receiving the Access-Accept message, the V-AAA server/proxy records the lifecycle of the MSK, and judges whether the remaining lifetime of the HA-RK is less than or equal to the lifecycle of the MSK. In this way, the technical solution under the present invention is also applicable in the case that the HA-RK and the MSK are generated by different AAA servers. After the visited HA is selected, the HA-RK related information is delivered by the V-AAA server/proxy.

It is worthy of attention that the V-AAA server and the V-AAA agent may be in different entities. In this case, the V-AAA server and the V-AAA agent involve further request processes. For example, the V-AAA agent obtains the remaining lifetime of the HA-RK from the V-AAA server, and then judges whether the remaining lifetime of the HA-RK is less than or equal to the lifecycle of the MSK. Alternatively, the V-AAA agent transfers the MSK lifecycle information to the V-AAA server, and the V-AAA server judges whether the remaining lifetime of the HA-RK is less than or equal to the lifecycle of the MSK. Anyway, the V-AAA server and the V-AAA agent may be logically regarded as one logical entity.

Figure 7:
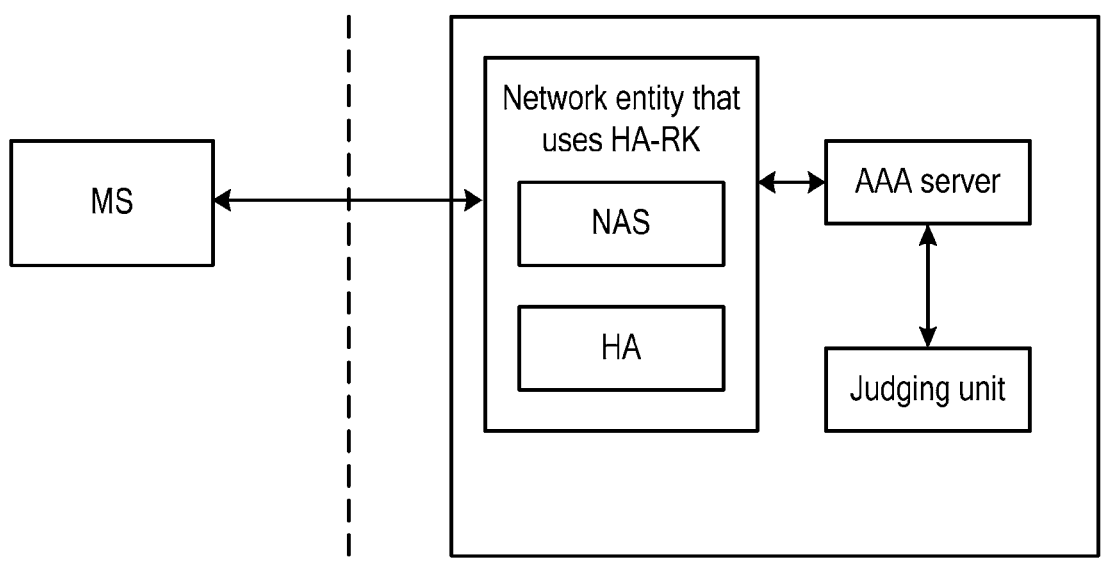
FIG. 7 shows a structure of a MIP system in the fourth embodiment of the present invention.

The fourth embodiment of present invention relates a MIP system. The MIP system may be a WiMAX system. As shown in FIG. 7, the system includes: an AAA server, a network entity that uses an HA-RK, such as NAS and HA, a judging unit, and an MS.

The judging unit is adapted to: judge whether the remaining lifetime of the old HA-RK fulfills a preset condition before expiry of the old HA-RK; instruct the AAA server to generate a new HA-RK and send the new HA-RK to each network entity that uses the HA-RK, if the remaining lifetime fulfills the preset condition. In the EAP process initiated by the MS, the judging unit is triggered to make the judgment. The judging unit is a logical unit. It is generally a function module of the AAA server or AAA agent, or part of other entities, or even an independent entity.

The preset condition is: The remaining lifetime of the HA-RK is less than or equal to the MSK lifecycle generated for the MS. In practice, the judging unit may be part of the AAA server or AAA agent. Evidently, the AAA server generates and delivers a new HA-RK before expiry of the old HA-RK, thus eliminating the time gap between expiry of the old HA-RK and obtaining of the new HA-RK and making the MIP registration seamless.

If the network entity stores a new valid HA-RK and an old valid HA-RK, the old HA-RK remains active and the new HA-RK does not work until expiry of the lifecycle of the old HA-RK. Alternatively, both the old HA-RK and the new HA-RK are active concurrently and differentiated by an SPI, thus eliminating conflict that may occur when two HA-RKs coexist.

To sum up, in the embodiments of the present invention, the AAA server generates and delivers a new HA-RK before expiry of the old HA-RK, thus eliminating the time gap between expiry of the old HA-RK and obtaining of the new HA-RK and making the MIP registration seamless.

On condition that the lifecycle of the HA-RK is greater than the lifecycle of the MSK, if the remaining lifetime of the old HA-RK is less than or equal to the lifecycle of the MSK in the EAP process, a new HA-RK is delivered; otherwise, no new HA-RK needs to be delivered. Through the relevant mechanism in the EAP process, it is ensured that a new HA-RK is delivered in time before expiry of the old HA-RK. Without the need of delivering the HA-RK in every EAP process, the EAP process is more efficient.

If both a new HA-RK and an old HA-RK are valid on the network entity at a time, only the old HA-RK applies and the new HA-RK is not active until expiry of the old HA-RK. Alternatively, both the new HA-RK and the old HA-RK are active concurrently, and are differentiated by an SPI. In this way, the conflict between two coexistent HA-RKs is overcome.

The foregoing embodiments take a Client MIP (CMIP) as an example, but a Proxy MIP (PMIP) may be applied instead. No matter whether the MIP is a CMIP or PMIP, the steps related to the essence of the present invention are the same except for slight differences in initiating a MIP.

Although the invention is described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for updating a home agent root key (HA-RK) in a mobile internet protocol (MIP) system that includes computer networking nodes, a computer networking node including computer hardware with non-transitory memory which store instructions when executed by the computer hardware implement functions, the method by the computer networking nodes comprising:
  generating, by an authentication authorization accounting (AAA) server computer networking node, a new HA-RK, and sending the new HA-RK to a network authentication server (NAS) computer networking node before expiry of an old HA-RK;
  wherein the generating, by the AAA server computer networking node, of the new HA-RK, and the sending of the new HA-RK to the NAS computer networking node before the expiry of the old HA-RK further comprises:
    determining whether a remaining lifetime of the old HA-RK is less than or equal to a lifecycle of a master session key (MSK) generated for a mobile station (MS) computer networking node;

generating, by the AAA server computer networking node, the new HA-RK and sending the new HA-RK to the NAS computer networking node corresponding to the MS computer networking node through a message of an extensible authentication protocol (EAP) process upon a determination by the AAA server computer networking node or an AAA agent to the AAA server computer networking node that the remaining lifetime of the old HA-RK is less than or equal to the lifecycle of the MSK;

wherein a lifecycle of each of the new HA-RK and the old HA-RK is greater than the lifecycle of the MSK; and wherein upon a determination that the old HA-RK is generated by a visited AAA (V-AAA) server computer networking node and the MSK is generated by a home AAA (HAAA) server computer networking node, a visited AAA (V-AAA) agent to the V-AAA server computer networking node records the lifecycle of the MSK in the EAP process, obtains the remaining lifetime of the old HA-RK from the V-AAA server computer networking node, and determines whether the remaining lifetime of the old HA-RK is less than or equal to the lifecycle of the MSK; or the V-AAA agent records the lifecycle of the MSK in the EAP process and transfers information about the lifecycle of the MSK to the V-AAA server computer networking node, and the V-AAA server computer networking node determines whether the remaining lifetime of the old HA-RK is less than or equal to the lifecycle of the MSK.

2. The method according to claim 1, wherein:

the AAA server computer networking node sends the new HA-RK to the NAS computer networking node through an access-accept message of the EAP process, wherein the access-accept message further carries one or more of a security parameter index (SPI) corresponding to the new HA-RK and the lifecycle of the new HA-RK.

3. The method according to claim 1, wherein:

the AAA server computer networking node that generates the MSK obtains the lifecycle of the old HA-RK from the AAA server computer networking node that generates the old HA-RK in the EAP process upon a determination that the old HA-RK and the MSK are generated by different AAA server computer networking nodes.

4. The method according to claim 1, wherein upon a determination that the new HA-RK and the old HA-RK are valid on the NAS computer networking node concurrently, before the expiry of the old HA-RK, the old HA-RK remains active and the new HA-RK does not work until the expiry of the old HA-RK; or the new HA-RK and the old HA-RK work concurrently and are differentiated by a security parameter index (SPI).

5. A mobile internet protocol (MIP) system of computer networking nodes, a computer networking node including computer hardware with non-transitory memory which store instructions when executed by the computer hardware implement functions, the system comprising:

an authentication authorization accounting (AAA) server computer networking node that generates a new home agent root key (HA-RK) and send the new HA-RK to a network authentication server (NAS) computer networking node before expiry of an old HA-RK through a message of an extensible authentication protocol (EAP) process; and the NAS computer networking node that receives the new HA-RK from the AAA server computer networking node before the expiry of the old HA-RK;

the AAA server computer networking node determines whether a remaining lifetime of the old HA-RK is less than or equal to a lifecycle of a master session key (MSK) generated for a mobile station (MS) computer networking node, and generates and sends the new HA-RK to the NAS computer networking node corresponding to the MS computer networking node through a message of the EAP upon determining that the remaining lifetime of the old HA-RK is less than or equal to the lifecycle of the MSK;

the MIP system further comprises an AAA agent to the AAA server computer networking node, the AAA agent determines whether the remaining lifetime of the old HA-RK is less than or equal to the lifecycle of the MSK generated for the MS computer networking node, and instruct the AAA server computer networking node to generate and send the new HA-RK to the NAS computer networking node corresponding to the MS computer networking node through a message of the EAP process upon a determination by the AAA agent that the remaining lifetime of the old HA-RK is less than or equal to the lifecycle of the MSK, wherein a lifecycle of each of the new HA-RK and the old HA-RK is greater than the lifecycle of the MSK, wherein the AAA agent comprises a visited AAA (V-AAA) agent and the AAA server computer networking node comprises a visited AAA (V-AAA) server, and upon a determination that the old HA-RK is generated by the visited AAA (V-AAA) server and the MSK is generated by a home AAA (HAAA) server computer networking node, the V-AAA agent records the lifecycle of the MSK in the EAP process, obtains the remaining lifetime of the old HA-RK from the V-AAA server, and determines whether the remaining lifetime of the old HA-RK is less than or equal to the lifecycle of the MSK; or the V-AAA agent records the lifecycle of the MSK in the EAP process and transfers information about the lifecycle of the MSK to the V-AAA server, and the V-AAA server determines whether the remaining lifetime of the old HA-RK is less than or equal to the lifecycle of the MSK.

6. The MIP system according to claim 5, wherein the AAA server computer networking node further sends the new HA-RK to the NAS computer networking node through an access-accept message of the EAP process.

7. The MIP system according to claim 5, wherein the EAP process is triggered by the MS computer networking node.

8. The MIP system according to claim 5, wherein the MIP system is a worldwide interoperability for microwave access system.

9. An authentication authorization accounting (AAA) server computer networking node, comprising:

computer hardware with non-transitory memory which store instructions when executed by the computer hardware implement functions of:

determine whether a remaining lifetime of an old home agent root key (HA-RK) is less than or equal to a lifecycle of a master session key (MSK) generated for a mobile station (MS) computer networking node, and generate a new HA-RK before expiry of the old HA-RK in a message of an extensible authentication protocol (EAP) process upon determining that the remaining lifetime of the old HA-RK is less than or equal to the lifecycle of the MSK, wherein a lifecycle of each of the new HA-RK and the old HA-RK is greater than the lifecycle of the MSK; and a transmitter, configured to send the new HA-RK to a network authentication server (NAS) computer networking node corresponding to the MS computer networking node, wherein the computer hardware implements a visited AAA (V-AAA) server, and upon a determination that the old HA-RK is generated by the V-AAA server and the MSK is generated by a Home AAA (HAAA) server computer networking node, the lifecycle of the MSK in the EAP process is recorded by a visited AAA (V-AAA) agent, and the remaining lifetime of the old HA-RK is obtained from the V-AAA server by the V-AAA agent to determine whether the remaining lifetime of the old HA-RK is less than or equal to the lifecycle of the MSK; or the lifecycle of the MSK in the EAP process is recorded by the V-AAA agent to transfer information about the lifecycle of the MSK to the V-AAA server, so that V-AAA server determines whether the remaining lifetime of the old HA-RK is less than or equal to the lifecycle of the MSK.

10. The AAA server computer networking node according to claim 9, wherein the transmitter is further configured to send the new HA-RK to the NAS computer networking node through an access-accept message of the EAP process.

11. The AAA server computer networking node according to claim 9, wherein the EAP process is triggered by the MS computer networking node.

\* \* \* \* \*